(12) United States Patent
Seo et al.

(10) Patent No.: US 12,724,305 B2
(45) Date of Patent: Sep. 1, 2026

(54) DISPLAY DEVICE HAVING OPTICAL PATH CONTROL MEMBER AND TILED DISPLAY DEVICE INCLUDING THE SAME

(71) Applicant: LG Display Co., Ltd., Seoul (KR)

(72) Inventors: Younghyen Seo, Paju-si (KR); Yoonhyung Joo, Paju-si (KR); Sangduk Lee, Paju-si (KR); Dongim Huo, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 371 days.

(21) Appl. No.: 18/529,427

(22) Filed: Dec. 5, 2023

(65) Prior Publication Data

US 2024/0184161 A1 Jun. 6, 2024

(30) Foreign Application Priority Data

Dec. 5, 2022 (KR) ........................ 10-2022-0167636
Nov. 3, 2023 (KR) ........................ 10-2023-0150683

(51) Int. Cl.

*G02F 1/13* (2006.01)
*G02F 1/1333* (2006.01)
*G02F 1/1335* (2006.01)
*G02F 1/1368* (2006.01)

(52) U.S. Cl.

CPC .... *G02F 1/133526* (2013.01); *G02F 1/13336* (2013.01); *G02F 1/133514* (2013.01); *G02F 1/1368* (2013.01)

(58) Field of Classification Search

CPC ........... G02F 1/133526; G02F 1/13336; G02F 1/133514; G02F 1/1368
USPC ........................................................... 257/72
See application file for complete search history.

(56) References Cited

U.S. PATENT DOCUMENTS 11,513,392 B1 * 11/2022 Luo ................... G02F 1/133603
2016/0131945 A1 * 5/2016 Woo .................. G02F 1/133536 349/96
2016/0178810 A1 * 6/2016 Chung .................. G02B 3/005 359/741
2018/0373053 A1 * 12/2018 Huang .................. G02B 6/003

FOREIGN PATENT DOCUMENTS

KR 20120061556 A * 6/2012 ......... G02F 1/13336
KR 10-1838096 B1 3/2018
KR 10-2020-0049826 A 5/2020
WO WO-2020122043 A1 * 6/2020 ........... G02F 1/1368

* cited by examiner

*Primary Examiner* — Phuc T Dang
(74) *Attorney, Agent, or Firm* — Birch, Stewart, Kolasch & Birch, LLP

(57) ABSTRACT

A tiled display device in one example includes a plurality of display devices, and an optical path control member disposed on each of the plurality of display devices. The optical path control member includes a first base layer, a second base layer disposed to be spaced apart from the first base layer in a thickness direction, an air layer interposed between the first base layer and the second base layer, and a lens disposed on the second base layer.

21 Claims, 11 Drawing Sheets

170
174
172
173
171
CF3
CF2
CF1
DA
NDA
BA
BM
115
Im*
Im
160
150
140
130
120
110
I
I'

FIG. 7

170
174
172
173
171
CF1 CF2 CF3
DA
NDA
BA
I'
I
20
22 21
Im*
Im'
Im
BM
115
160
150
140
130
120
110
Z
X
Y

DISPLAY DEVICE HAVING OPTICAL PATH CONTROL MEMBER AND TILED DISPLAY DEVICE INCLUDING THE SAME

CROSS REFERENCE TO RELATED APPLICATION

The present application claims priority to Korean Patent Application No. 10-2022-0167636, filed Dec. 5, 2022, and Korean Patent Application No. 10-2023-0150683, filed Nov. 3, 2023, the entire contents of all these applications being hereby expressly incorporated by reference into the present application.

BACKGROUND OF THE INVENTION

Field of the Invention

The present invention relates to a display device and a tiled display device including the same.

Discussion of the Related Art

As the information society develops, a demand for display devices for displaying images is increasing in various forms. For example, the display devices are applied to various electronic devices such as smartphones, digital cameras, laptop computers, navigation systems, and smart televisions. The display device can be a flat panel display device such as a liquid crystal display device, a field emission display device, or an organic light emitting display device.

When the display device is manufactured in a large size, a defect rate of the light emitting device can increase due to an increase in the number of pixels, and productivity or reliability can be degraded. In order to solve this issue, a tiled display device can implement a large screen by connecting a plurality of relatively smaller display devices.

The tiled display device aligns a plurality of display devices adjacent to each other to be visible as one large display device. The tiled display device can include a boundary area between the plurality of display devices due to a non-display area or bezel area of each of the plurality of adjacent display devices. However, when a single image is displayed on the entire screen, the boundary area between the plurality of display devices can create a sense of disconnection in the entire screen, thereby reducing immersion in the image.

SUMMARY OF THE INVENTION

Embodiments of the present invention are directed to providing a display device for refracting outgoing light in an outer direction using an optical path control member including an air layer in an edge area, and are directed to a tiled display device including such display device.

In addition, the embodiments are directed to providing a tiled display device arranging a light emitting device package in a boundary area of a plurality of display devices and for outputting an image in the boundary area.

A tiled display device according to one embodiment includes a plurality of display devices and an optical path control member disposed on each of the plurality of display devices.

Further, the various aspects of the tiled display device according to the present invention are discussed.

For example, the optical path control member can include a first base layer, a second base layer disposed to be spaced apart from the first base layer in a thickness direction, an air layer interposed between the first base layer and the second base layer, and a lens disposed on the second base layer. A cross section of the lens can be an isosceles triangle or right triangle.

The air layer can have a smaller refractive index than the first base layer and the second base layer.

Light entering the optical path control member can be primarily refracted in a lateral direction of the display device from an interface between the first base layer and the air layer, and light transmitting the air layer can be secondarily refracted in a forward direction of the display device from an interface between the air layer and the second base layer.

Each of the plurality of display devices can include a display area and a non-display area surrounding the display area, and the plurality of display devices can be disposed with a boundary area interposed therebetween.

The display area can display a predetermined image in an edge area of the display area, and a virtual image for the predetermined image can be displayed in the boundary area by the secondarily refracted light.

The optical path control member can be formed in the edge area of the display area.

The tiled display device can further include a light emitting device package disposed in the boundary area.

The light emitting device package can include light emitting devices mounted on a substrate and configured to display a portion of an image or a predetermined color displayed in an adjacent display device.

Each of the display devices can further include a lower substrate, a thin film transistor (TFT) array layer formed on the lower substrate, a light emitting device layer formed on the TFT array layer, a cover substrate disposed to face the lower substrate, a color filter disposed between the light emitting device layer and the cover substrate, and a sealing member interposed between the lower substrate and the cover substrate and formed in the non-display area to surround the display area.

The color filter layer can include a black matrix interposed between the sealing member and the cover substrate.

The sealing member can be formed to be in direct contact with the cover substrate.

The color filter layer can include color filters disposed in the display area to convert a wavelength of light generated from the light emitting device layer, and at least one color filter disposed at an outermost side of the color filters can extend to the non-display area.

The extended at least one color filter can be interposed between the sealing member and the cover substrate.

A display device according to one embodiment of the present invention includes a lower substrate including a display area and a non-display area, a TFT array layer formed in the display area on the lower substrate, a light emitting device layer formed in the display area on the TFT array layer, a cover substrate disposed to face the lower substrate, a color filter layer disposed between the light emitting device layer and the cover substrate, and an optical path control member formed on the cover substrate.

The optical path control member can include a first base layer, a second base layer disposed to be spaced apart from the first base layer in a thickness direction, an air layer interposed between the first base layer and the second base layer, and a lens disposed on the second base layer. A cross section of the lens can be an isosceles triangle or right triangle.

The air layer can have a smaller refractive index than the first base layer and the second base layer.

Light entering the optical path control member can be primarily refracted in a lateral direction of the display device from an interface between the first base layer and the air layer, and light transmitting the air layer can be secondarily refracted in a forward direction of the display device from an interface between the air layer and the second base layer.

The display area can display a predetermined image in an edge area of the display area, and a virtual image for the predetermined image can be displayed in the non-display area by the secondarily refracted light.

The optical path control member can be formed in the edge area of the display area.

The display device can further include a sealing member interposed between the lower substrate and the cover substrate and formed in the non-display area to surround the display area, wherein the sealing member can be formed to be in direct contact with the cover substrate.

The color filter layer can include color filters disposed in the display area to convert a wavelength of light generated from the light emitting device layer, and at least one color filter disposed at an outermost side of the color filters can extend to the non-display area.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 7 is a view illustrating a moving path of light due to the optical path control member in FIG. 5.

DETAILED DESCRIPTION OF THE EMBODIMENTS

Figure 1:
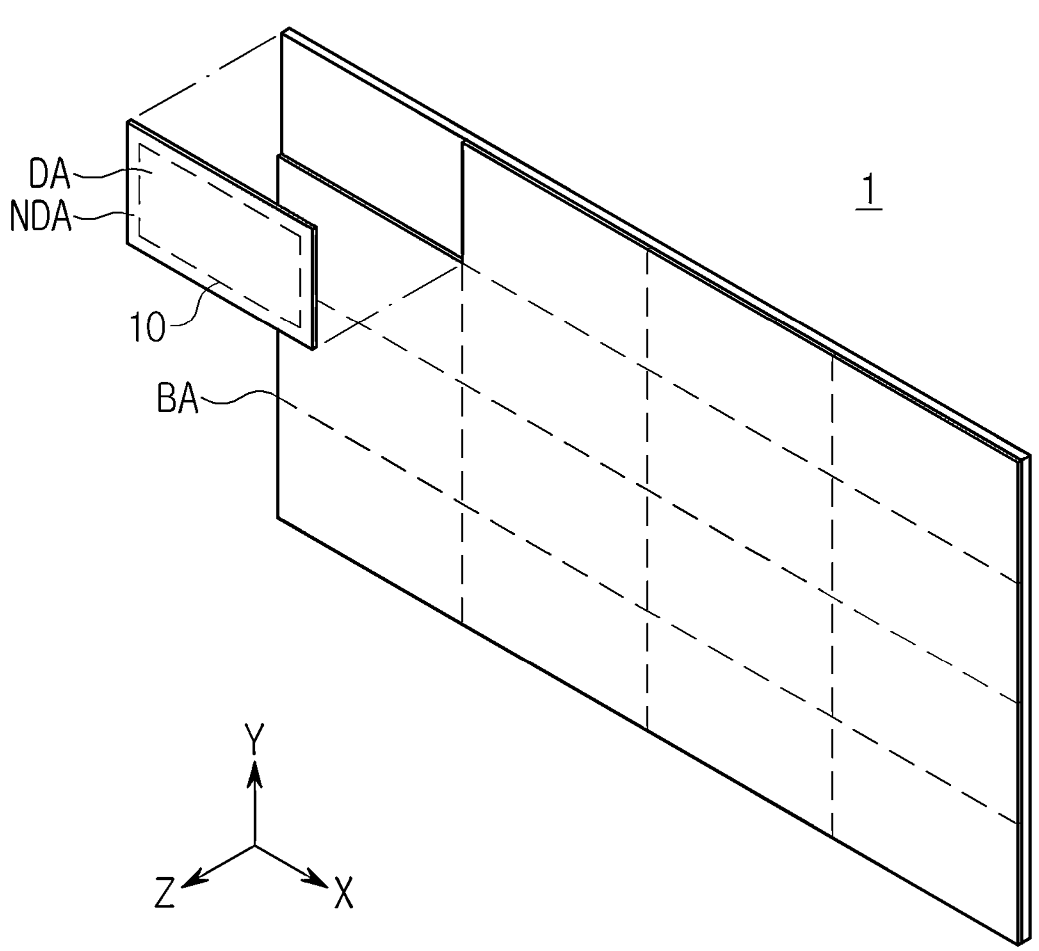
FIG. 1 is a plan view illustrating a tiled display device according to one embodiment of the present invention.

Hereinafter, embodiments of the present invention will be described with reference to the accompanying drawings. In the specification, when a first component (or an area, a layer, a portion, or the like) is described as "on," "connected," or "coupled to" a second component, it means that the first component can be directly connected/coupled to the second component or a third or additional components can be disposed therebetween.

The same reference numerals indicate the same components. In addition, in the drawings, thicknesses, proportions, and dimensions of components are exaggerated for effective description of technical contents. The term "and/or" includes all one or more combinations that can be defined by the associated configurations.

Terms such as first and second can be used to describe various components, but the components are not limited by the terms. The terms are used only for the purpose of distinguishing one component from another, and may not define order or sequence. For example, a first component can be referred to as a second component, and similarly, the second component can also be referred to as the first component without departing from the scopes of the embodiments. The singular expression includes the plural expression unless the context clearly dictates otherwise.

Terms such as "under," "at a lower side," "above," and "at an upper side" are used to describe the relationship between the components illustrated in the drawings. The terms are relative concepts and are described with respect to directions marked in the drawings.

It should be understood that term such as "includes" or "has" is intended to specify the presence of features, numbers, steps, operations, components, parts, or a combination thereof described in the specification and does not preclude the presence or addition possibility of one or more other features, numbers, steps, operations, components, parts, or combinations thereof in advance.

Features of various embodiments of the present invention can be partially or entirely coupled to or combined with each other and can be operated, linked, or driven together in various ways. Embodiments of the present invention can be carried out independently from each other, or can be carried out together in co-dependent or related relationship. In one or more aspects, the components of each device or apparatus according to various embodiments of the present invention are operatively coupled and configured.

FIG. 1 is a front view illustrating a tiled display device according to one embodiment of the present invention.

Referring to FIG. 1, a tiled display device 1 can include a plurality of display devices 10. The display devices 10 can be disposed in a grid, but is not limited thereto. The display devices 10 can be connected in a first direction (e.g., X direction) and a second direction (e.g., Y direction), and the tiled display device 1 can have a specific shape. The display devices 10 can have the same or different sizes.

The tiled display device 1 can have an overall planar shape, but is not limited thereto. The tiled display device 1 can provide a three-dimensional effect to the user by having a three-dimensional shape. For example, when the tiled display device 1 has the three-dimensional shape, at least some of the display devices 10 can have a curved shape. Alternatively, each of the display devices 10 has a planar shape and is connected to each other at a predetermined angle, so that the tile-type display device 1 can have a three-dimensional shape.

Each of the display devices 10 can have a rectangular shape including a long side and a short side. The display devices 10 can be disposed so that the long side or the short side is connected. Some of the display devices 10 can be disposed at edges of the tiled display device 1 to form one side of the tiled display device 1. The others of the display devices 10 can be disposed at the edges of the tiled display device 1 to form adjacent two sides of the tiled display device 1. The others of the display devices 10 can be disposed at the edges of the tiled display device 1 to form adjacent two sides of the tiled display device 1.

Each display device 10 can include a display area (or active area) DA and a non-display area (or non-active area)

NDA. The display area DA can include a plurality of pixels and display an image. The non-display area NDA can be disposed around the display area DA to surround the display area DA and may not display the image. The non-display area NDA can surround the display area DA in each display device 10 completely or only in part.

The tiled display device 1 can be formed by connecting the non-display areas NDA of each of adjacent display devices 10. The display devices 10 can be connected through a coupling member or bonding member. A distance between the display areas DA of the adjacent display devices 10 can be close enough that the non-display area NDA between the display devices 10 is not recognized by the user.

As described above, by connecting several display devices 10 to form one tiled display device 1, a large-area screen can be displayed.

In the embodiment, the tiled display device 1 can include a boundary area BA disposed between the display devices 10. In other words, the display devices 10 can be disposed with the boundary area BA interposed therebetween. The display devices 10 can be connected through a coupling member or bonding member in the boundary area BA.

A black matrix, edge potting, or the like can be disposed on an outermost portion of the display device 10 as a light blocking element to prevent leakage of front and side light. In addition, components such as a chip on film (COF) or tape finishing material of the corresponding display device 10 can be disposed in the boundary area BA. Therefore, the display areas DA of the adjacent display devices 10 can be spaced apart from each other by the boundary area BA between the display devices 10 to give a sense of disconnection to the entire screen and reduce immersion in the image.

Hereinafter, various structures of the tiled display device 1 for solving or addressing this limitation according to the present invention will be described.

Figure 2:
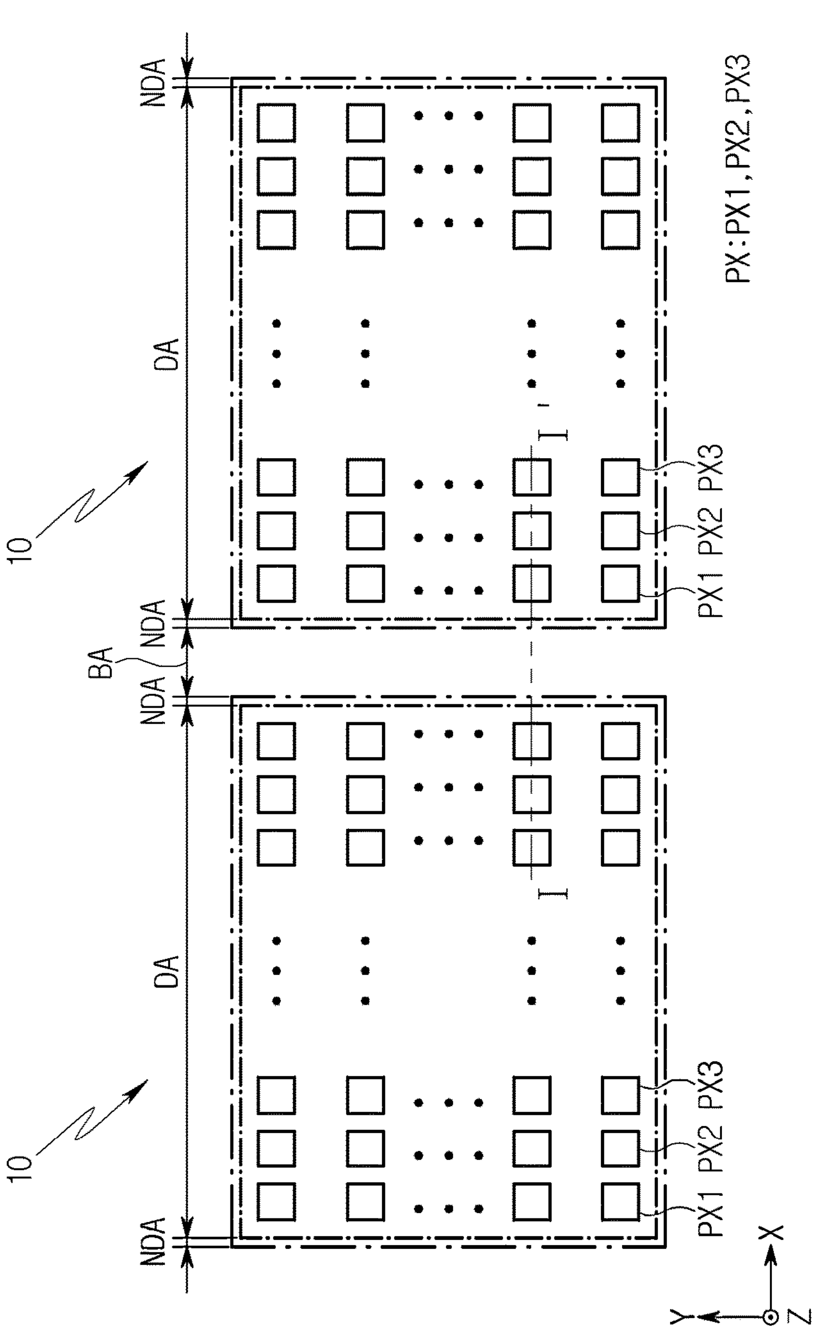
FIG. 2 is a plan view illustrating a display device according to one embodiment of the present invention.

FIG. 2 is a plan view illustrating a display device according to one embodiment of the present invention. In particular, FIG. 2 illustrates two adjacent display devices 10 as an example, but these configurations are applicable to any display device of the present invention.

Referring to FIG. 2, the display device 10 can include pixels PX arranged along a plurality of rows and columns in the display area DA. Each pixel PX can include a light-emitting area defined by a pixel defining layer (or bank) and emit light with a predetermined peak wavelength through the light emitting area. For example, the display area DA of the display device 10 can include first to third pixels PX1, PX2, and PX3. Each of the first to third pixels PX1, PX2, and PX3 can output light.

The first to third pixels PX1, PX2, and PX3 can output light with a predetermined peak wavelength. The first pixel PX1 can emit light of a first color, the second pixel PX2 can emit light of a second color, and the third pixel PX3 can emit light of a third color. For example, the light of the first color can be red light with a peak wavelength ranging from 610 to 650 nm, the light of the second color can be green light with a peak wavelength ranging from 510 to 550 nm, and the light of the third color can be blue light with a peak wavelength ranging from 440 to 480 nm, but is not limited thereto.

The first to third pixels PX1, PX2, and PX3 can be sequentially and repeatedly disposed in the first direction X of the display area DA. In one embodiment, the first to third pixels PX1, PX2, and PX3 can have the same or different areas.

Figure 3:
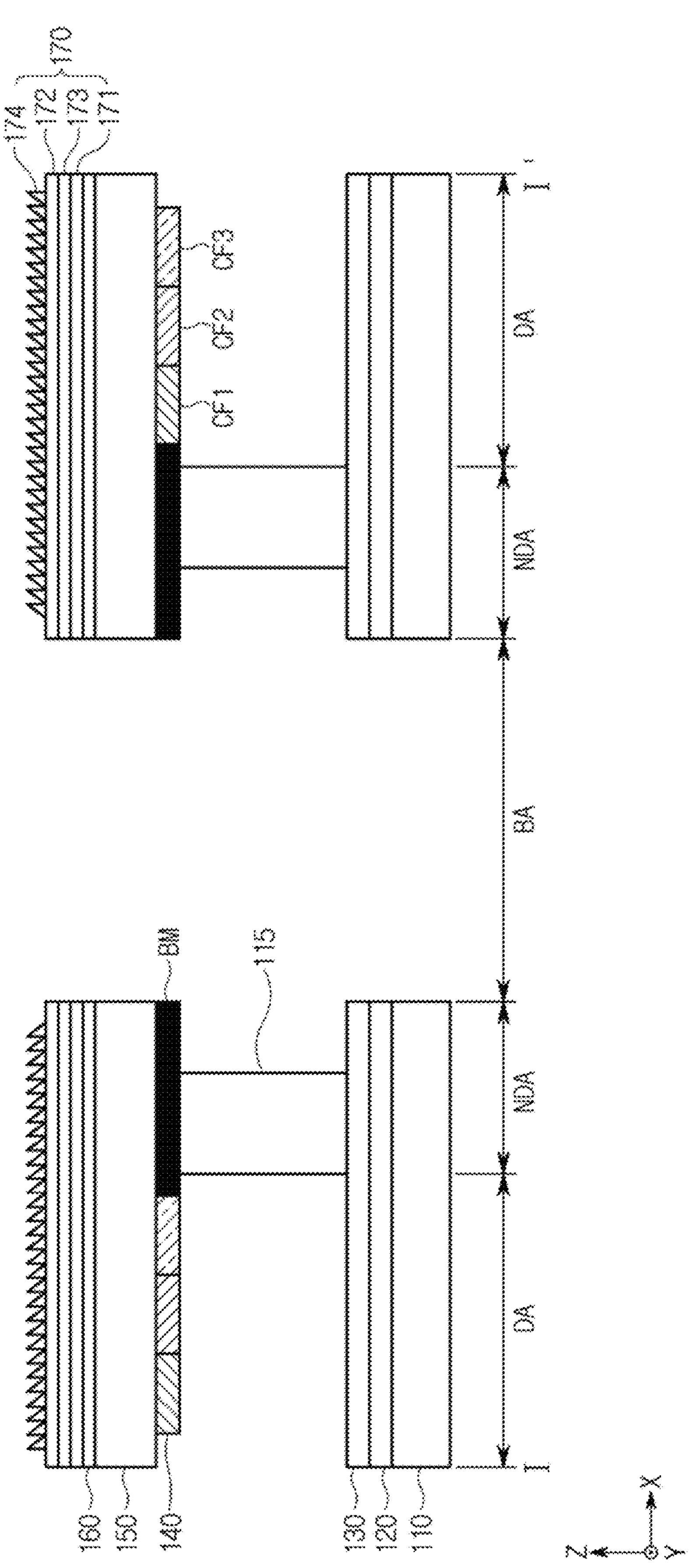
FIG. 3 illustrates one example of a cross-sectional view along line I-I' in FIG. 2.
Figure 4:
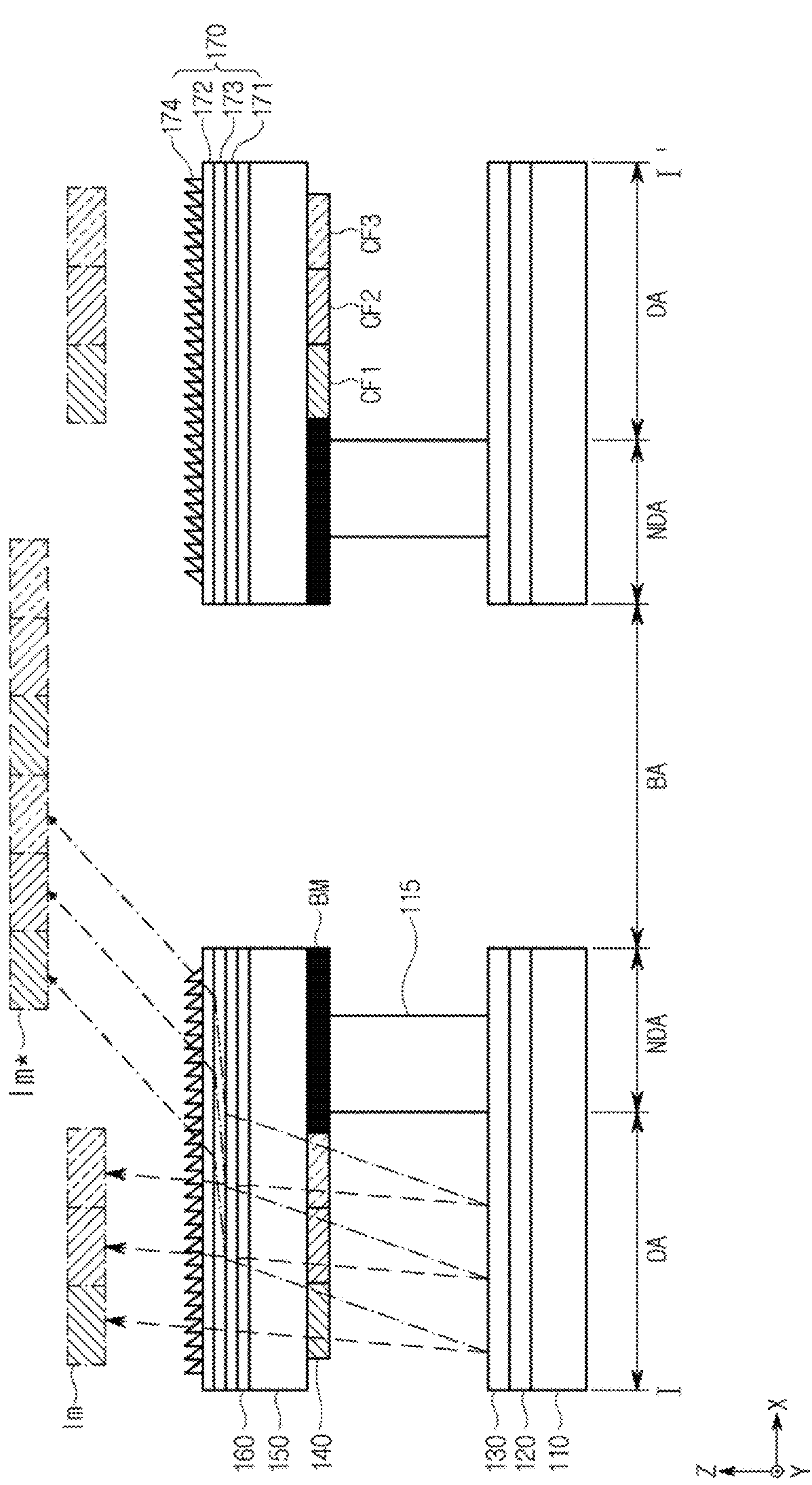
FIG. 4 is a view illustrating a moving path of light due to an optical path control member in FIG. 3.

FIG. 3 illustrates one example of a cross-sectional view along line I-I' in FIG. 2. FIG. 4 is a view illustrating a moving path of light due to an optical path control member in FIG. 3.

Referring to FIG. 3, the display area DA of the display device 10 according to one embodiment can include first to third pixels PX1, PX2, and PX3. Each of the first to third pixels PX1, PX2, and PX3 can emit generated light to the outside of the display device 10.

The display device 10 can include a lower substrate 110, a thin film transistor (TFT) array layer 120, a light emitting device layer 130, a color filter layer 140, and a cover substrate 150.

The lower substrate 110 can be a base substrate of the display device 10 and a light transmissive substrate. The lower substrate 110 can be a rigid substrate including glass or tempered glass or a flexible substrate made of a plastic material. For example, the lower substrate 110 is a flexible polymer film and can be any one of polyethylene terephthalate (PET), polycarbonate (PC), or acrylonitrile-butadiene-styrene copolymer (ABS), polymethyl methacrypxte (PMMA), polyethylene naphthaPXte (PEN), polyether sulfone (PES), cyclic olefin copolymer (COC), a triacetylcellulose (TAC) film, a polyvinyl alcohol (PVA) film, polyimide (PI), and polystyrene (PS). However, a material of the lower substrate 110 is not limited thereto.

The TFT array layer 120 is formed on the lower substrate 110. The TFT array layer 120 can be formed with a transistor (e.g., a driving transistor and at least one switching transistor) and at least one capacitor for controlling a driving current to be applied to the light emitting device layer 130 to be described below.

The light emitting device layer 130 is formed on the TFT array layer 120. The light emitting device layer 130 can include a first electrode, a second electrode, and a light emitting layer interposed therebetween. The first electrode can be connected to the transistor of the TFT array layer 120 and referred to as a pixel electrode (or an anode electrode). The second electrode can receive a common voltage supplied to all pixels PX1, PX2, and PX3 and can be referred to as a common electrode (or a cathode electrode). The light emitting layer can be disposed between the first electrode and the second electrode. In one embodiment, the light emitting layer can include liquid crystal or an organic/inorganic light emitting device.

The cover substrate 150 can be disposed on the lower substrate 110 to block electrical devices (transistors, capacitors, and the like), light emitting layers, or the like provided on the lower substrate 110 from external impurities. The cover substrate 150 can be positioned to face the lower substrate 110, and the lower substrate 110 and the cover substrate 150 can be bonded by a sealing member disposed along the edges thereof. For example, the cover substrate 150 can be made of the same material as the lower substrate 110. According to the embodiment, a polarizing layer can be positioned on at least some areas of the lower surface of the lower substrate 110.

The sealing member 115 can be interposed between the lower substrate 110 and the cover substrate 150. The sealing member 115 can be implemented in the form of a frame disposed in the non-display area NDA to surround the display area DA. A space separated by the sealing member 115 can be filled with a predetermined material to prevent light loss and increase a bonding strength between the lower substrate 110 and the cover substrate 150. The sealing member 115 can be made of an organic film capable of forming fine patterns, such as polyimides resin, acryl resin, or benzocyclobutene (BCB).

The color filter layer 140 can be provided between the cover substrate 150 and the light emitting device layer 130. The color filter layer 140 can be provided to convert a wavelength of light generated from the light emitting device layer 130 so that each of the pixels PX1, PX2, and PX3 (see FIG. 2) can emit light in a corresponding color. The color filter layer 140 can include color filters CF1, CF2, and CF3 corresponding to each of the pixels PX1, PX2, and PX3 of the display area DA.

For example, the first color filter CF1 can selectively transmit the light of the first color (e.g., green light), and the second color filter CF2 can block or absorb the light of the second color (e.g., red light) and the light of the third color (e.g., blue light). The second color filter CF2 can selectively transmit the light of the second color (e.g., red light) and block or absorb the light of the first color (e.g., green light) and the light of the third color (e.g., blue light). The third color filter CF3 can selectively transmit the light of the third color (e.g., blue light) and block or absorb the light of the first color (e.g., green light) and the light of the second color (e.g., red light).

In one embodiment, the color filters CF1, CF2, and CF3 can be surrounded by a black matrix BM as a light blocking member. In this embodiment, the black matrix BM can be formed between the sealing member 115 and the cover substrate 150.

In one embodiment, a polarizing layer 160 can be formed on the cover substrate 150. The polarizing layer 160 can emit light emitted from the display area DA to the outside and absorb light introduced from the outside to increase the visibility of the image.

An optical path control member 170 is further formed on the polarizing layer 160. The optical path control member 170 can include base layers 171 and 172 and a lens 174 disposed on the base layers 171 and 172. A cross section of the lens 174 can be in a shape of an isosceles triangle or right triangle. When the cross section of the lens 174 is a right triangle, a side adjacent to the display area DA can be a vertical side extending at 90 degrees with respect to surfaces of the base layers 171 and 172, and an opposite side thereof can be the hypotenuse.

The base layers 171 and 172 can be made of an insulating material such as transparent polymer resin or glass through which light can transmit. For example, the base layers 171 and 172 are polyethylene terephthalate (PET), polymethyl methacrylate (PMMA), poly carbonate (PC), poly propylene (PP), poly ethylene (PE), poly styrene (PS), or mixtures thereof. In one embodiment, a release film or the like capable of performing an optical function can be further mounted above or under the base layers 171 and 172.

The lens 174 can be formed of a plurality of triangular (prism) patterns. The triangular pattern can function to concentrate or disperse light passing through the base layers 171 and 172 upward. Triangular patterns are formed to have a triangular cross section (e.g., an isosceles triangle or right triangle). When the cross section of the triangular pattern is not an equilateral triangle but an isosceles triangle, the triangular pattern can allow the light passing through the base layers 171 and 172 to further emit in a specific direction or block the emission of the light in the specific direction.

When the cross section of the triangular pattern is a right triangle, it is possible to minimize the emission of light in the specific direction. Specifically, when the cross section of the triangular pattern is a right triangle, light is emitted only to the hypotenuse of the right triangle, and the emission of the light to an opposite side is minimized.

The lens 174 can be made of transparent polymer resin through which light can transmit. For example, the lens 174 can contain polyethylene terephthalate (PET), polymethyl methacrylate (PMMA), poly carbonate (PC), poly propylene (PP), poly ethylene (PE), poly styrene (PS), or mixtures thereof.

In one embodiment, the base layers 171 and 172 can include the first base layer 171 and the second base layer 172 disposed to be spaced apart from each other in a thickness direction (Z-axis direction). An air layer 173 (e.g., air gap or air space) can be formed between the first base layer 171 and the second base layer 172. A refractive index of the air layer is about 1 and can have a smaller refractive index than the base layers 171 and 172. In various embodiments, the optical path control member 170 can have a structure in which the base layers 171 and 172 including the air layer 173 are repeatedly stacked.

Referring to FIG. 4, light entering a lower surface of the optical path control member 170 transmits the first base layer 171 and is primarily refracted at an interface between the first base layer 171 and the air layer 173. At this time, since the refractive index of the first base layer 171 is larger than the refractive index of the air layer 173, light is refracted in a lateral direction, for example, in the first direction (e.g., X direction) and/or the second direction (e.g., Y direction). The light passing through the air layer 173 is secondarily refracted at an interface with the second base layer 172. At this time, since the refractive index of the second base layer 172 is larger than the refractive index of the air layer 173, light is refracted in an upward direction (third direction, e.g., Z direction).

Through this structure, light generated in the light emitting device layer 130 can be widely emitted in the lateral direction of the display device 10 through the optical path control member 170. In addition, since the optical path control member 170 includes two base layers 171 and 172 and the air layer 173 interposed therebetween, the light generated from the light emitting device layer 130 can be dispersed in the lateral direction and at the same time, concentrated toward a front surface, and thus it is possible to increase the brightness in a front direction.

In one embodiment, the optical path control member 170 can be formed at an edge area of the display area DA of each of the display devices 10 and can be formed to extend from the edge area of the display area DA to the non-display area NDA. For example, the optical path control member 170 can be disposed so that at least a portion of the light path control member 170 overlaps the sealing member 115 formed at the edge of the display area DA. In this embodiment, the optical path control member 170 can further refract a portion of light generated from the light emitting device layer 130 and emitted in the lateral direction of the display device 10 in an outer direction in the edge area of the display area DA. Therefore, a viewing angle can be partially increased in the edge area of the display device 10.

A predetermined image Im can be displayed in the edge area of the display area DA. As illustrated in FIG. 4, the light refracted by the optical path control member 170 can exceed an area of the sealing member 115 and can be displayed as a virtual image Im* for a real image Im on the boundary area BA between the non-display areas NDA or the display devices 10.

In one embodiment, in order to prevent the image from appearing unclear or giving a sense of heterogeneity due to the real image Im and the virtual image Im*, thicknesses of the layers of the air layer 173 and the optical path control member 170 can be determined appropriately. For example, thicknesses of the first base layer 171 and the second base layer 172 can be in a range of about 100 to 125 um, but is not limited thereto. In addition, the thickness of the air layer 173 can be in a range of about 10 to 40 um, but is not limited thereto. In one embodiment, the first base layer 171 and the second base layer 172 can have a thickness of about 125 um, and the air layer 173 can have a thickness of about 40 um.

A refractive index of the lens 174 can be in a range of about 1.42 to 1.62, but is not limited thereto. A distance between the triangular patterns can be in a range of 50 to 70 um, but is not limited thereto. In one embodiment, the refractive index of the lens 174 is about 1.62, and the distance between the triangular patterns can be about 70 um.

A thickness of the polarizing layer 160 can be about 200 um. However, the values of the optical path control member 170 are not limited to those described above.

In the above embodiment, the tiled display device 1 displays the virtual image Im* similar to the real image Im in the boundary area (BA) between the display devices 10 through the optical path control member 170. Therefore, the border area BA of the tiled display device 1 is not visible to the user, and the user can recognize the image as being continuously present even in the boundary area BA, thereby eliminating the feeling of disconnection of the entire screen and improving immersion in the image. In addition, the optical path control member 170 can be formed only in a portion of the edge area of the display device 10, thereby minimizing the process cost and simplifying the process.

Figure 5:
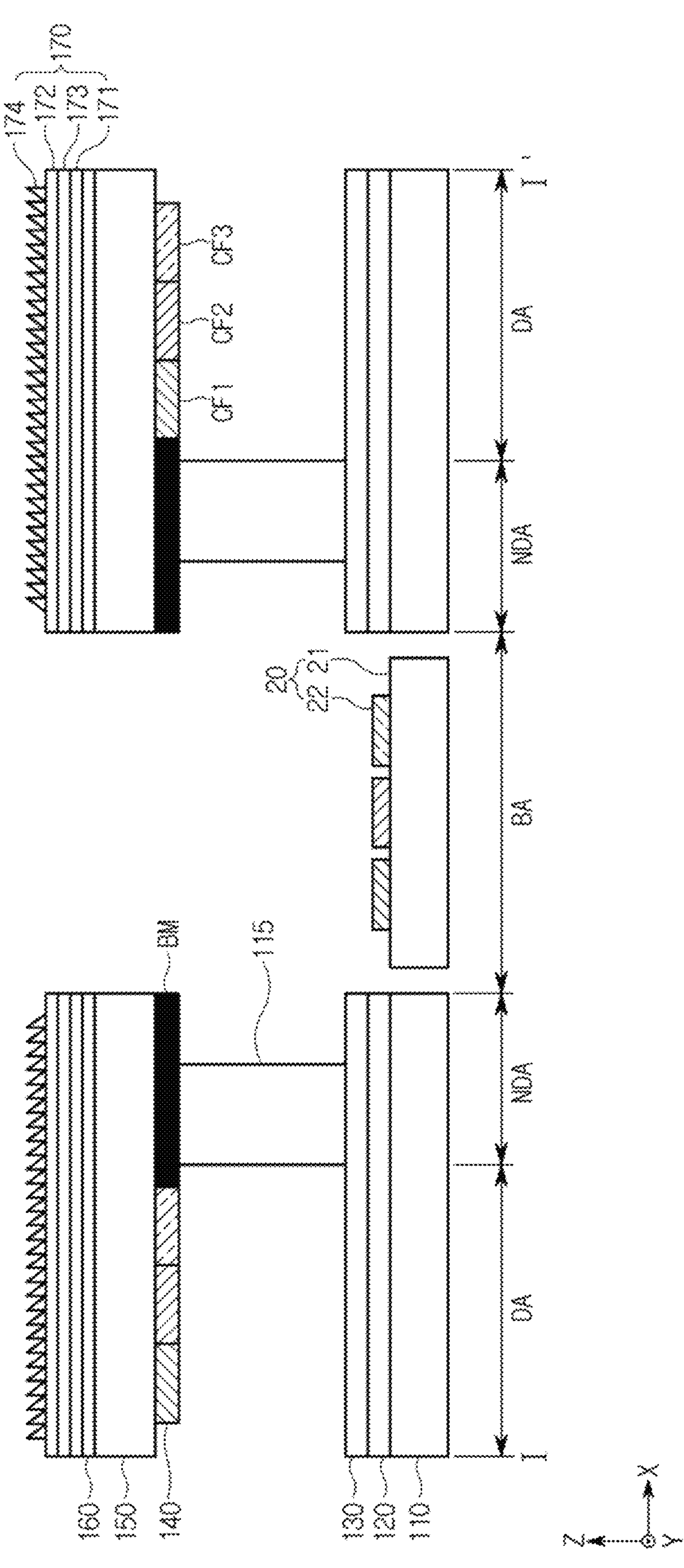
FIG. 5 illustrates another example of the cross-sectional view along line I-I' in FIG. 2.
Figure 6:
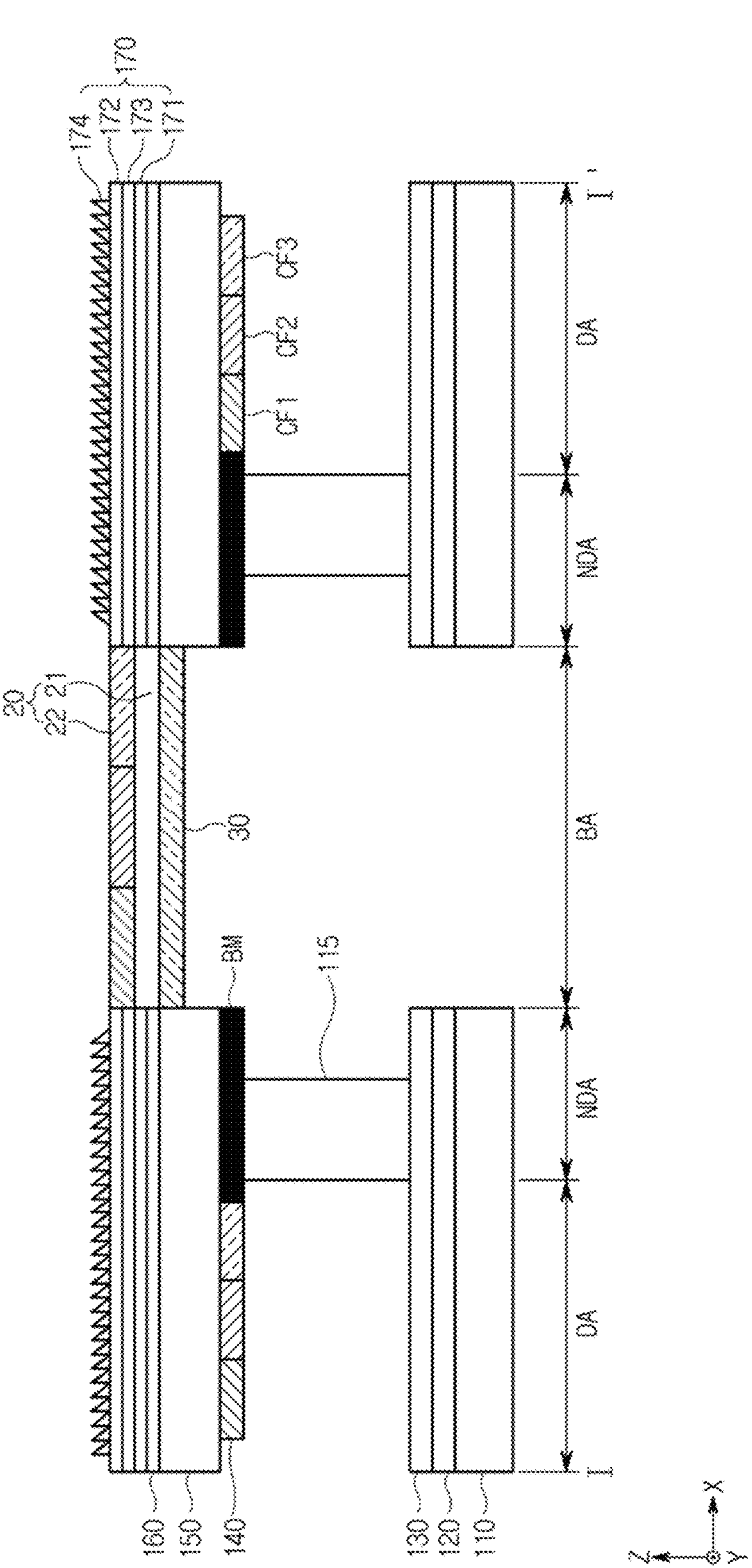
FIG. 6 is a view illustrating one example in which a light emitting device package is coupled between adjacent display devices.
Figure 7:
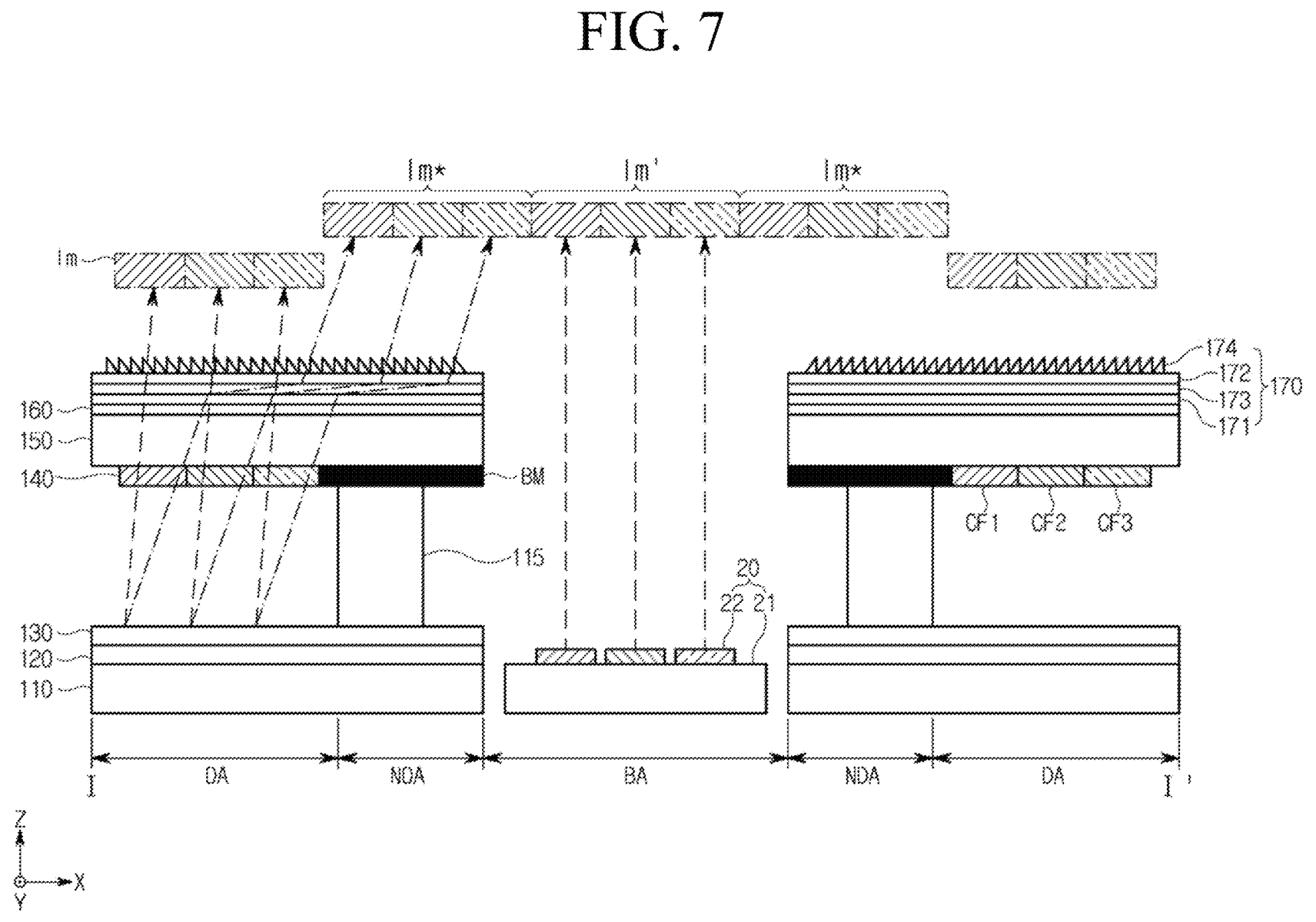

FIG. 5 illustrates another example of the cross-sectional view along line I-I' in FIG. 2. FIG. 6 is a view illustrating one example in which a light emitting device package is coupled between adjacent display devices. FIG. 7 is a view illustrating a moving path of light due to the optical path control member in FIG. 5.

Referring to FIG. 5, the tiled display device 1 according to one embodiment can further include a light emitting device package 20 disposed in the boundary area BA between the display devices 10. The light emitting device package 20 can include a plurality of light emitting devices 22 mounted on a substrate 21.

The light emitting devices 22 can be the same as or equivalent to the light emitting devices provided in the light emitting device layer 130 of the display device 10. These light emitting devices 22 are liquid crystal or organic/inorganic light emitting devices and can generate light of one of blue, green, and red. However, the present invention is not limited thereto, and the light emitting devices 22 can generate light of one of magenta, cyan, yellow, and white depending on the color emitted from the display device 10.

The light emitting devices 22 of the light emitting device package 20 can constitute at least one pixel. Preferably, the light emitting device package 20 can include the light emitting devices 22 in a quantity and arrangement state corresponding to one pixel PX in the display device 10.

The light emitting devices 22 are controlled to display a portion of the image, arbitrary color, or image displayed on the display device 10. For example, the light emitting devices 22 can be controlled to emit light with the same gradation and brightness as the image displayed in the edge area of the display device 10. According to the embodiment, the image displayed on the light emitting devices 22 can be a corrected image of the image displayed in the edge area. Alternatively, for example, the light emitting devices 22 can be controlled to express, an arbitrary color, for example, a gradation that is relatively less visible to the user.

The light emitting devices 22 can be controlled by arbitrary adjacent display device 10 or can be controlled through a separate independent control unit.

In one embodiment, as illustrated in FIG. 5, the light emitting device package 20 can be aligned with the lower substrate 110 disposed at the bottom in the thickness direction Z of the display devices 10. In another embodiment, as illustrated in FIG. 6, the light emitting device package 20 can be aligned with the top (e.g., the cover substrate 150 or the light path control member 170) of the display device 10.

Referring to FIG. 6, the light emitting device package 20 can have both ends fixedly coupled to the display devices 10 through a fixing member 30, such as a flange, coupled to the cover substrates 150 (or the lower substrate 110) of the display devices 10 between adjacent display devices 10.

Referring to FIG. 7, the light emitting device package 20 displays an image Im', which is the same as or equivalent to the edge area of the adjacent display devices 10, in the boundary area BA between the display devices 10. As described above, when an image is displayed in the boundary area BA through the light emitting device package 20, the boundary area BA of the tiled display device 1 is not visible to the user, and the user can also recognize the image as present continuously in the boundary area BA, it is possible to eliminate the sense of disconnection of the entire screen and improve immersion in the image.

In one embodiment, the display device 10 is configured to display the virtual image Im* at an outer side of the display device 10 by the optical path control member 170. In this case, the image Im' displayed by the light emitting device package 20 can be aligned between the virtual images Im* displayed by the optical path control members 170 of adjacent display devices 10. Therefore, the virtual images Im* of the adjacent display devices 10 and the image Im' displayed by the light emitting device package 20 can form one continuous image together with the rear image Im disposed on the display devices 10.

In the present embodiment(s), it is possible to more efficiently shield the external view of the boundary area BA through the light emitting device package 20 disposed in the boundary area BA and further improve the continuity of all images.

Figure 8:
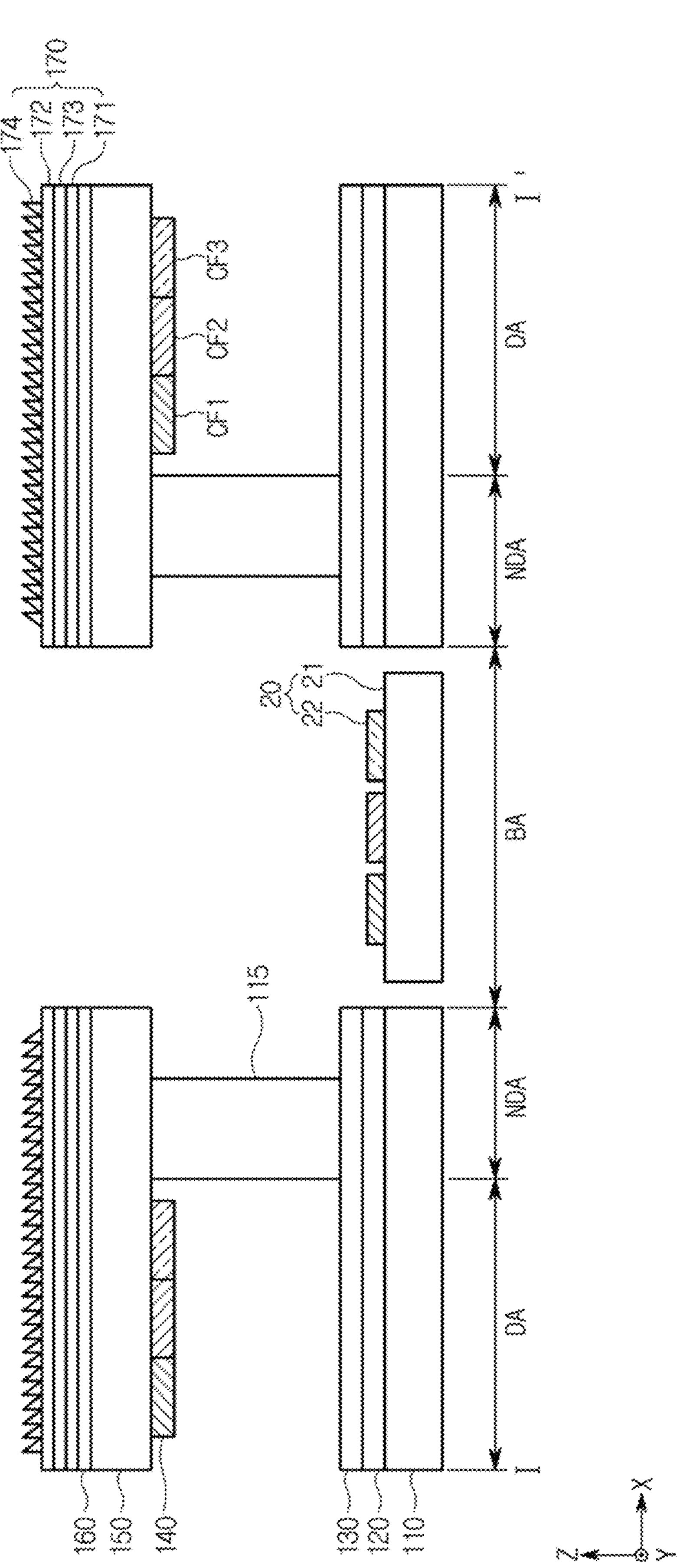
FIGS. 8 and 9 illustrate still another example of the cross-sectional view along line I-I' in FIG. 2.
Figure 9:
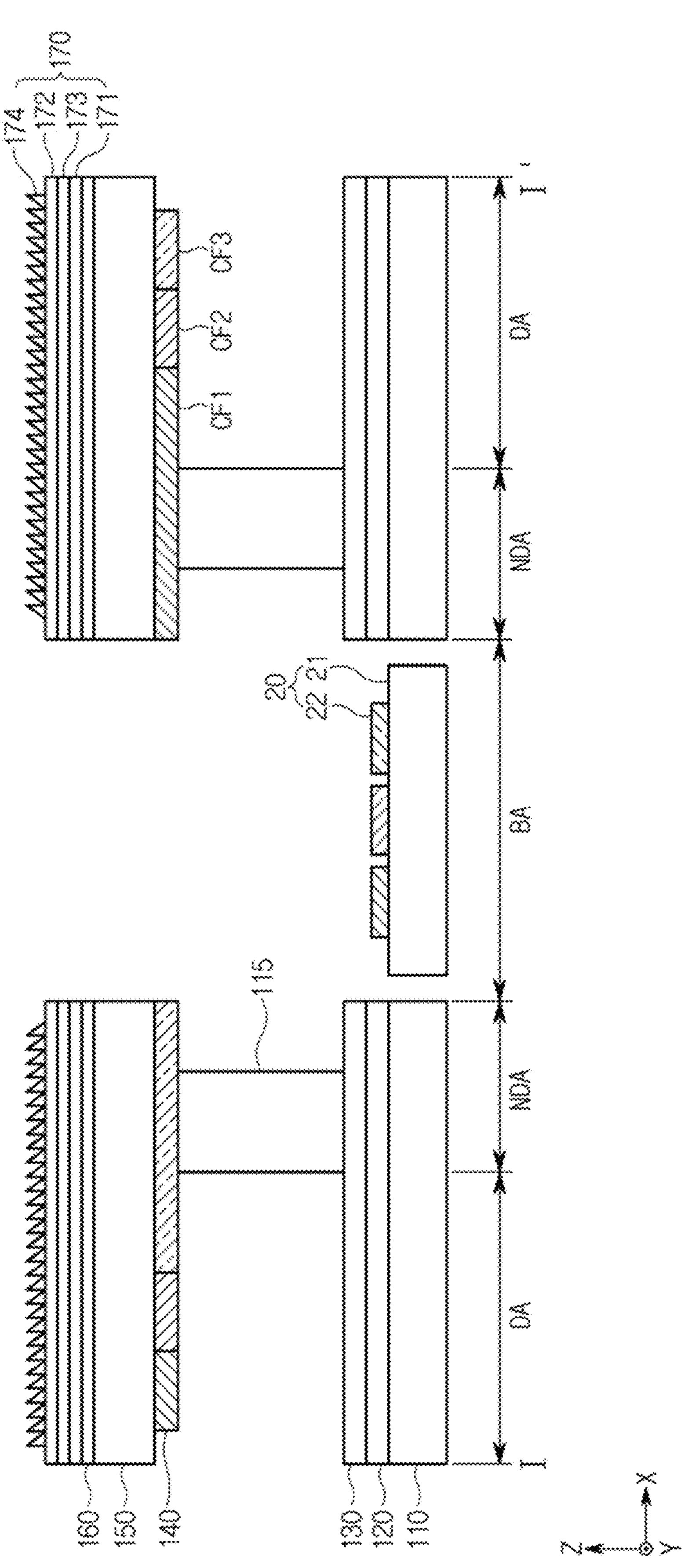

FIGS. 8 and 9 illustrate still another example of the cross-sectional view along line I-I' in FIG. 2.

Referring to FIGS. 8 and 9, the black matrix BM is omitted from the color filter layer 140 of the display device 10. The black matrix BM is disposed in the edge area of the display area DA and is made of black dye and thus can be visible to the user as a dark area.

Referring to FIG. 8, in one embodiment, by removing the black matrix BM from the color filter layer 140, it is possible to prevent the dark areas between the display devices 10 from being visible to the user. Alternatively, in the present embodiment, since the image is displayed through the optical path control member 170 and/or the light emitting device package 20 in the edge area of the display area DA, the black matrix BM can be omitted.

In this embodiment, the sealing member 115 can be interposed between the lower substrate 110 and the cover substrate 150 in the edge area of the display device 10. In other words, the sealing member 115 is formed to be in direct contact with the cover substrate 150.

In another embodiment, as illustrated in FIG. 9, the color filters CF1 and CF3 disposed at the outermost side of the color filter layer 140 can extend to the non-display area NDA. In other words, the color filters CF1 and CF3 formed at the outermost side of the display area DA extend to the non-display area NDA. In this embodiment, extended color filters CF1 and CF3 are disposed between the sealing member 115 and the cover substrate 150.

Compared to the embodiment of FIG. 8, in the embodiment of FIG. 9, the edge area of the display area DA can display light of an arbitrary color through the extended color filters CF1 and CF3, thereby preventing the sense of foreign matter or discontinuity in the image from being visible.

Figure 10:
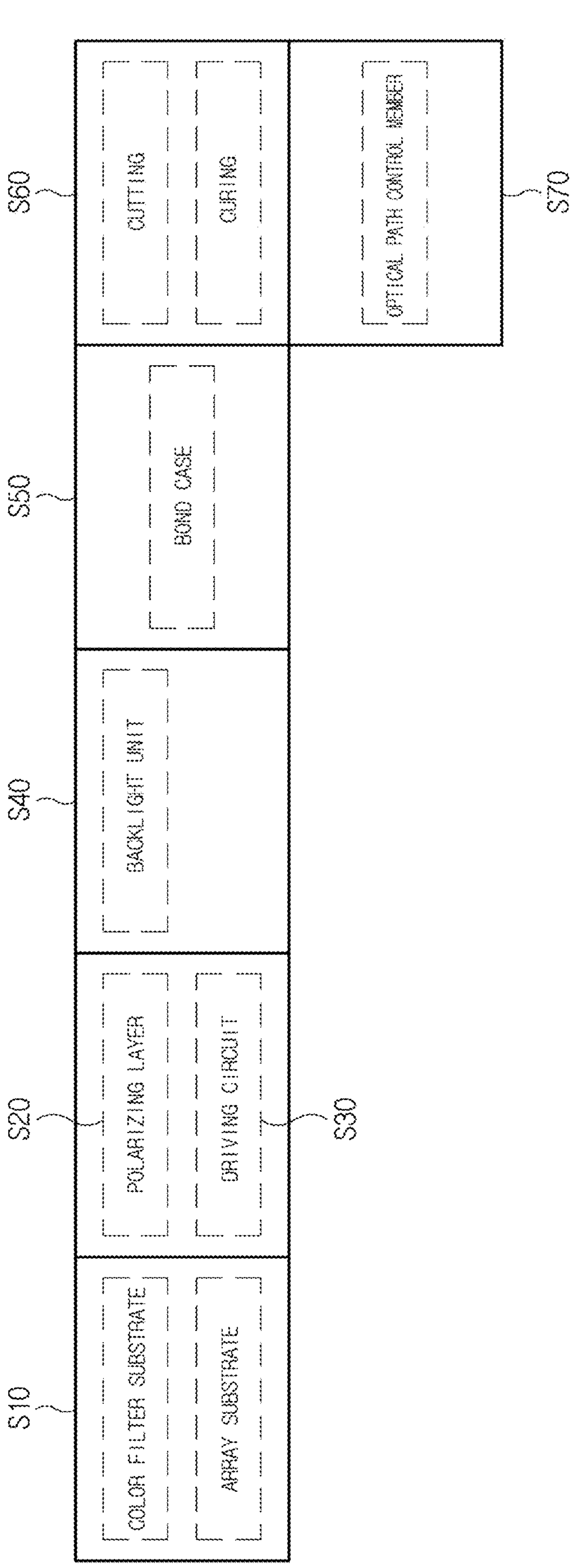
FIG. 10 is a view illustrating a manufacturing process of the display device according to one embodiment of the present invention.

FIG. 10 is a view illustrating a manufacturing process of the display device according to one embodiment. Hereinafter, a manufacturing process will be described, for example, based on a case in which the display device 10 is an LCD.

Referring to FIG. 10, the display device 10 according to one embodiment can be manufactured through a conveyor provided to accommodate and transport the assembly. The conveyors transport assemblies during each process.

First, a TFT-cell process can be performed (S10). A TFT array layer and a light emitting device layer can be formed on a substrate through the TFT-cell process.

For example, the TFT-cell process can include a process of forming an array substrate and color filter substrate, a process of forming an alignment film, a process of forming a seal pattern and a spacer, a process of injecting liquid crystal, a bonding process, a cutting process, an inspection process, and the like.

A plurality of pixels are defined on the array substrate, and each of the pixels includes a transistor and is connected to an electrode formed on the light emitting device layer. Red, green, or blue color filters can be formed on the color filter substrate to correspond to each pixel. According to the embodiment, a black matrix surrounding the color filters can be further formed on the color filter substrate.

According to the embodiment, a facing film can be applied to the array substrate and the color filter substrate and subjected to curing and rubbing treatment.

Thereafter, a seal pattern (sealing member) of at least one of the array substrate and the color filter substrate can be printed, and spacers for maintaining a gap therebetween can be further formed. Once the seal pattern is formed, liquid crystal is dropped on one of the two substrates, and the two substrates are bonded and cut to complete an array assembly.

According to the embodiment, an inspection process of the completed array assembly can be performed.

Next, a polarizing layer attaching process (S20) of attaching a polarizing layer to an outer side of the color filter substrate can be performed, and a driving circuit attaching process (S30) of attaching a driving circuit to the array substrate can be performed. The driving circuit can be attached by a tape automated bonding (TAB) method of mounting a driving circuit connecting an array substrate to electrical signals directly on a tape carrier package (TCP).

A test process for a panel assembly completed as described above can be further performed.

Next, a backlight unit assembly process (S40) of assembling a backlight unit on a lower surface of the panel assembly can be performed. Assembling the backlight unit can include a process of forming a light source on a lower surface of a liquid crystal panel, a light source guide for guiding the light source, a light guide plate for directing light entering from the light source toward the liquid crystal panel, and a plurality of optical sheets.

Then, a case assembly process (S50) of assembling (e.g., bonding) a case to the panel assembly can be performed. Assembling the case can include a process of sequentially assembling a modular case through a top cover, a support main, and a cover button.

Then, a cutting and hardening (e.g., curing) process (S60) can be performed. The display panel assembly can be cut to an appropriate size according to a product profile and dried to completely cure the bonding resin or the like filled inside the assembly.

In the present embodiment, the optical path control member forming process (S70) can be performed before or after the cutting and curing process (S60). The optical path control member forming process (S70) can include a process of sequentially forming a first base layer, a second base layer, and a lens on a polarizing layer and forming an air layer between the first base layer and the second base layer. In the present embodiment, the optical path control member can be formed on a portion of an edge of the display area in which pixels are formed in the panel assembly.

Figure 11:
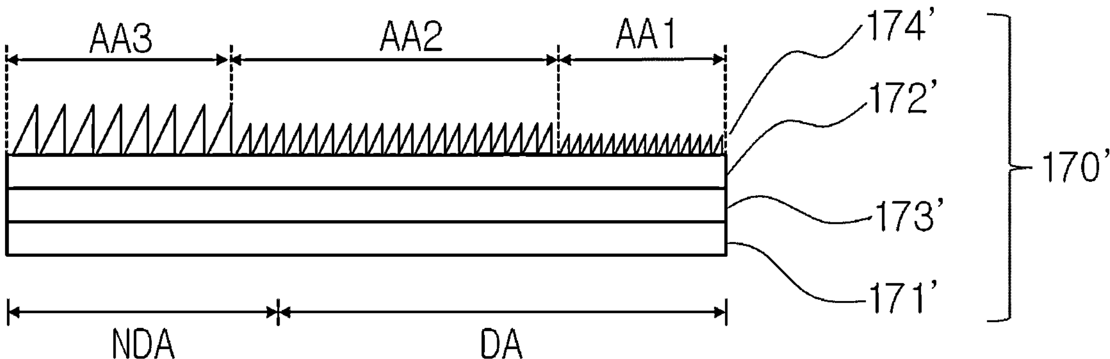
FIG. 11 is a cross-sectional view of an optical path control member according to another embodiment of the present invention.

FIG. 11 is a cross-sectional view of an optical path control member according to another embodiment of the present invention, which can be used in the display devices of the present invention.

Referring to FIG. 11, an optical path control member 170' can include base layers 171' and 172' and a lens 174' disposed on the base layers 171' and 172'. A cross section of lens 174' can be an isosceles triangle or right triangle.

The base layers 171' and 172' can be made of an insulating material such as transparent polymer resin or glass through which light can transmit. For example, the base layers 171' and 172' are polyethylene terephthalate (PET), polymethyl methacrylate (PMMA), poly carbonate (PC), poly propylene (PP), poly ethylene (PE), poly styrene (PS), or mixtures thereof.

The lens 174' can be formed of a plurality of triangular (prism) patterns. The triangular pattern can function to concentrate or disperse light passing through the base layers 171' and 172' upward. Triangular patterns are formed to have a triangular cross section (e.g., an isosceles triangle or right triangle).

In one embodiment, the triangular patterns forming the lens 174' can have different sizes. For example, the triangular patterns can be formed to gradually increase from one area of the base layers 171' and 172' to other areas. For example, the triangular patterns can be formed to be relatively smaller on the display area DA and relatively larger on an area adjacent to the edge of the display area DA and/or the non-display area NDA. For example, as illustrated, the sizes of the triangular patterns can be formed to have a first size in a first area AA1 on the display area DA, a third size larger than the first size in a third area AA3 on the non-display area NDA, and a second size larger than the first size and smaller than the third size between the first area AA1 and the third area AA3. However, this is only an example, and the present embodiment is not limited thereto. The triangular patterns can be formed in more types of sizes or in less types of sizes.

In this embodiment, the triangular patterns can have the same shape in the entire area, and thus an angle of each corner can be the same and only a length of each corner can be formed to be increased at a predetermined ratio. In addition, in other embodiments, the triangular patterns can have different shapes in areas or have at least one different angle.

The lens 174' can be made of transparent polymer resin through which light can transmit. For example, the lens 174 can include polyethylene terephthalate (PET), polymethyl methacrylate (PMMA), poly carbonate (PC), poly propylene (PP), poly ethylene (PE), poly styrene (PS), or mixtures thereof. When the triangular patterns forming the lens 174' have different sizes in the areas of the base layers 171' and 172', paths of light passing through the lens 174' can be different in the areas of the optical path control member 170'. Specifically, as the size of the triangular pattern increases, the amount of lateral refraction of the light passing through the lens 174' can increase. Therefore, when the triangular patterns are formed with different sizes as illustrated, the transmitted light generally appears straight in the first area AA1 in which the triangular pattern is relatively smaller in size and only a small amount is refracted in the lateral direction so as not to disturb a front field of view. In addition, in the third area AA3 in which the size of the triangular pattern is relatively larger, the transmitted light is largely refracted in the lateral direction to further expand a lateral viewing angle of the edge area.

In one embodiment, the base layers 171' and 172' can include the first base layer 171' and the second base layer 172' disposed to be spaced apart from each other in the thickness direction (/Esther H. Chong/-axis direction). An air layer 173' (e.g., air gap or air space) can be formed between the first base layer 171' and the second base layer 172'. A refractive index of the air layer is about 1 and can have a smaller refractive index than the base layers 171' and 172'. In various embodiments, the optical path control member 170' can have a structure in which the base layers 171' and 172' including the air layer 173' are repeatedly stacked.

According to the display device and the tiled display device including the same according to the embodiments, by improving the recognition of the boundary area between the plurality of display devices for forming a tiled display device, it is possible to remove the sense of disconnection between the plurality of display devices and improve the immersion in the image.

In addition, according to the display device and the tiled display device including the same according to the embodiments of the present invention, it is possible to increase the brightness of the boundary area between the plurality of display devices and increase the front brightness of all display devices.

Although the embodiments of the present invention have been described above with reference to the accompanying drawings, those skilled in the art to which the present invention pertains will be able to understand that the above-described technical configuration of the present invention can be carried out in other specific forms without changing the technical spirit or essential features thereof. Therefore, it should be understood that the above-described embodiments are illustrative and not restrictive in all respects. In addition, the scope of the present invention is described by the claims to be described below rather than the detailed description. In addition, the meaning and scope of the claims and all changed or modified forms derived from the equivalent concept should be construed as being included in the scope of the present invention.

DESCRIPTION OF REFERENCE NUMERALS

1: tiled display device
10: display device
110: substrate
120: TFT array layer
130: light emitting device layer
140: color filter layer
150: cover substrate
160: polarizing layer
170: optical path control member
20: light emitting device package

What is claimed is:

1. A tiled display device comprising:
a plurality of display devices; and
an optical path control member disposed on a light-emitting surface of each of the plurality of display devices,
wherein the optical path control member includes:
a first base layer;
a second base layer disposed to be spaced apart from the first base layer in a thickness direction;
an air layer interposed between the first base layer and the second base layer; and
a lens disposed on the second base layer,
wherein a cross section of the lens corresponds to an isosceles triangle or right triangle, and
wherein light emitted from the each of the plurality of display devices sequentially passes through the first base layer, the air layer, the second base layer, and the lens.

2. The tiled display device according to claim 1, wherein the air layer has a smaller refractive index than at least one of the first base layer and the second base layer.

3. The tiled display device according to claim 2, wherein light entering the optical path control member is primarily refracted in a lateral direction of one of the plurality of display devices from an interface between the first base layer and the air layer, and
wherein light transmitting the air layer is secondarily refracted in a forward direction of the one of the plurality of display devices from an interface between the air layer and the second base layer.

4. The tiled display device according to claim 3, wherein each of the plurality of display devices includes a display area and a non-display area adjacent to the display area, and
wherein the plurality of display devices are disposed with a boundary area interposed therebetween.

5. The tiled display device according to claim 4, wherein the display area displays a predetermined image in an edge area of the display area, and
wherein a virtual image for the predetermined image is displayed in the boundary area by the secondarily refracted light.

6. The tiled display device according to claim 4, wherein the lens is formed to be gradually increased from the display area to the non-display area.

7. The tiled display device according to claim 6, wherein the optical path control member is formed in an edge area of the display area.

8. The tiled display device according to claim 7, further comprising a light emitting device package disposed in the boundary area.

9. The tiled display device according to claim 8, wherein the light emitting device package includes light emitting devices mounted on a substrate and configured to display a portion of an image or a predetermined color displayed in an adjacent display device.

10. The tiled display device according to claim 9, wherein each of the plurality of display devices further includes:
a lower substrate;
a thin film transistor (TFT) array layer formed on the lower substrate;
a light emitting device layer formed on the TFT array layer;
a cover substrate disposed to face the lower substrate;
a color filter layer disposed between the light emitting device layer and the cover substrate; and a sealing member interposed between the lower substrate and the cover substrate and formed in the non-display area to surround the display area.

11. The tiled display device according to claim 10, wherein the color filter layer includes a black matrix interposed between the sealing member and the cover substrate.

12. The tiled display device according to claim 10, wherein the sealing member is formed to be in direct contact with the cover substrate.

13. The tiled display device according to claim 10, wherein the color filter layer includes color filters disposed in the display area to convert a wavelength of light generated from the light emitting device layer, and wherein at least one color filter disposed at an outermost side of the color filters extends to the non-display area.

14. The tiled display device according to claim 13, wherein the extended at least one color filter is interposed between the sealing member and the cover substrate.

15. A display device comprising:

a lower substrate including a display area and a non-display area;

a thin film transistor (TFT) array layer disposed in the display area on the lower substrate;

a light emitting device layer disposed in the display area on the TFT array layer;

a cover substrate disposed to face the lower substrate;

a color filter layer disposed between the light emitting device layer and the cover substrate; and an optical path control member disposed on the cover substrate, wherein the optical path control member includes:

a first base layer;

a second base layer disposed to be spaced apart from the first base layer in a thickness direction;

an air layer interposed between the first base layer and the second base layer; and a lens disposed on the second base layer, wherein a cross section of the lens corresponds to an isosceles triangle or right triangle, and wherein light emitted from the display device sequentially passes through the first base layer, the air layer, the second base layer, and the lens.

16. The display device according to claim 15, wherein the air layer has a smaller refractive index than at least one of the first base layer and the second base layer.

17. The display device according to claim 16, wherein light entering the optical path control member is primarily refracted in a lateral direction of the display devices from an interface between the first base layer and the air layer, and wherein light transmitting the air layer is secondarily refracted in a forward direction of the display device from an interface between the air layer and the second base layer.

18. The display device according to claim 17, wherein the display area displays a predetermined image in an edge area of the display area, and wherein a virtual image for the predetermined image is displayed in the non-display area by the secondarily refracted light.

19. The display device according to claim 18, wherein the optical path control member is formed in the edge area of the display area.

20. The display device according to claim 19, further comprising a sealing member interposed between the lower substrate and the cover substrate and formed in the non-display area to surround the display area, wherein the sealing member is formed to be in direct contact with the cover substrate.

21. The display device according to claim 19, wherein the color filter layer includes color filters disposed in the display area to convert a wavelength of light generated from the light emitting device layer, and wherein at least one color filter disposed at an outermost side of the color filters extends to the non-display area.

* * * * *